United States Patent [19]
Dickes et al.

[11] Patent Number: 5,145,324
[45] Date of Patent: Sep. 8, 1992

[54] RAM AIR TURBINE DRIVING A VARIABLE DISPLACEMENT HYDRAULIC PUMP

[75] Inventors: Gary E. Dickes; Roger D. Brekhus; William E. Seidel, all of Rockford, Ill.

[73] Assignee: Sundstrand Corporation, Rockford, Ill.

[21] Appl. No.: 539,579

[22] Filed: Jun. 18, 1990

[51] Int. Cl.⁵ .................. F04B 17/02; F04B 1/26
[52] U.S. Cl. .................. 417/222.1; 60/447; 60/452
[58] Field of Search .......... 417/222 R, 221, 218, 417/222 S; 60/452, 447

[56] References Cited

U.S. PATENT DOCUMENTS

| | | | |
|---|---|---|---|
| Re. 31,711 | 10/1984 | Horiuchi | 417/222 R |
| 2,709,449 | 5/1955 | Garr et al. | 417/222 R |
| 3,125,960 | 3/1964 | Chilman . | |
| 3,149,678 | 9/1964 | Chilman et al. | 170/76 |
| 3,563,675 | 2/1971 | Straznickas | 417/222 R |
| 4,074,955 | 2/1978 | Nonnemacher et al. | 417/218 |
| 4,158,529 | 6/1979 | Nonnemacher et al. | 417/216 |
| 4,600,364 | 7/1986 | Nakatani et al. | 417/218 |
| 4,655,689 | 4/1987 | Westveer et al. | 417/222 R |
| 4,680,931 | 7/1987 | Jacobs | 60/447 |
| 4,711,616 | 12/1987 | Tsukahara et al. | 417/216 |
| 4,717,095 | 1/1988 | Cohen et al. | 244/58 |
| 4,742,976 | 5/1988 | Cohen | 244/58 |

OTHER PUBLICATIONS

"RAT has Hydraulic Pitch Change Servo", Oct. 1973 Issue of *Hydraulics & Pneumatics*, pp. 87-90.

*Primary Examiner*—Richard A. Bertsch
*Assistant Examiner*—David W. Scheuermann
*Attorney, Agent, or Firm*—Antonelli, Terry, Stout & Kraus

[57] ABSTRACT

An improved RAM air turbine (30) for the generation of emergency power on an airplane is disclosed. The RAM air turbine has an operational range in which reduced power is produced by a power controller (40) at speeds at which stalling of the RAM air turbine would occur under the control of a governor (16) which adjusts the pitch of the blades (12) of the turbine in combination with a pressure regulator (150) controlling the output of pressurized hydraulic fluid from a variable displacement hydraulic pump (19).

20 Claims, 8 Drawing Sheets

RAM AIR TURBINE DRIVING A VARIABLE DISPLACEMENT HYDRAULIC PUMP

CROSS-REFERENCE TO RELATED APPLICATIONS

Reference is made to patent application Ser. No. 539,200, entitled "RAM Air Turbine With Power Controller and Method of Operation", filed on even date herewith, which is assigned to the Assignee of the present invention, which application is incorporated by reference in its entirety; and to patent application Ser. No. 539,749, entitled "RAM Air Turbine With Power Controller With Disabling Mechanism of Power Controller and Method of Operation", filed on even date herewith, which is assigned to the Assignee of the present application, which application is incorporated herein by reference in its entirety; and to patent application Ser. No. 539,598 entitled "RAM Air Turbine With Operation in Plural Speed Ranges", filed on even date herewith, which is assigned to the Assignee of the present invention, which application is incorporated herein by reference in its entirety.

DESCRIPTION

1. Technical Field

The present invention relates to RAM air turbines used by airplanes for generating emergency power.

2. Background Art

Hydraulic and electric power is generated in airplanes by power takeoffs from the propulsion engines during flight and/or an auxiliary power unit. Control of an airplane is dependent upon the generation of electrical and/or hydraulic power. In the event that the propulsion engines are rendered inoperative during flight and emergency power cannot be generated by the APU, control of the airplane may not be maintained without an emergency power source which generates its power from the movement of the airplane through the air.

FIG. 1 illustrates two types of RAM air turbines which are used to generate emergency power in modern jet aircraft. A RAM air turbine is stored within (fuselage or wings) the airplane except during deployment for purposes of generating emergency power. Upon deployment, the RAM air turbine pivots from a stowed position within the airplane to a deployed position which depends downward from the fuselage to a position where air intercepts the RAM air turbine as a consequence of the velocity of the airplane moving through the air. The RAM air turbine 10 has a plurality of blades 12 which are mounted on a hub, not illustrated, which drives an output shaft 14. The RAM air turbine 10 has a governor 16 which adjusts the pitch of the blades 12 to maintain operation within a first rotational velocity range which typically varies between 4,000 and 6000 rpm. In commercial aircraft prior to the Airbus A330, the shaft 14 drove a variable displacement hydraulic pump 18 which produced high pressure hydraulic fluid 20 which was applied to a hydraulic load 32 such as a hydraulic motor and/or actuators. When applied to a hydraulic motor, the hydraulic motor is typically used to drive an electrical power generator for producing emergency electrical power. When applied to hydraulic actuators, hydraulically controlled elements, such as wing flaps are activated.

The variable displacement hydraulic pump contains a pressure regulator which regulates the output pressure of the hydraulic fluid 20 in an operational pressure range such as 3,000 psi±200 psi. The pressure regulator is used to develop a hydraulic displacement control signal which varies the displacement of the variable displacement hydraulic pump 18 to control the delivery of pressurized hydraulic fluid to the hydraulic load 32 to be within the pressure range established by the pressure regulator.

The flow rate of hydraulic fluid is controlled by variation of displacement of the variable displacement hydraulic pump 18 such that the displacement is inversely proportional to the high pressure output of the variable displacement motor within the operational pressure range. The control of the displacement is produced by a stroking piston which varies an angle of inclination of a wobbler to change the length of stroke of pistons of the variable displacement hydraulic pump. The stroking piston applies a force to one side of the wobbler. A rate piston applies a force to an opposite side of the wobbler. As a result, the displacement of the variable displacement hydraulic pump follows the extension of the stroking piston which varies inversely with the high pressure output of the variable displacement hydraulic pump.

The Airbus A330 contains a gearbox 22 which is driven by the shaft output 14. The gearbox 22 drives a variable displacement hydraulic pump 18 which functions as described above.

Prior art RAM air turbines are designed to be operated within a speed range for which the RAM air turbine may produce power without stalling to maintain control of the airplane when other power generating sources are not present. This speed range is typically from approximately 450 knots, which is the speed of the airframe when flying at normal cruising speeds when power from the propulsion engines is lost, to approximately 125 knots which is a speed at which a pilot would attempt to land the airplane without operation of the propulsion engines.

The governor 16 usually contains a hydraulically powered pitch control mechanism which varies the pitch from coarse to fine to provide increased power generation in response to increased demand for power from the hydraulic load while regulating speed within the first rotational velocity range as discussed above. Once the pitch of the blades 12 has been adjusted to its finest setting by the pitch adjustment mechanism of the governor 16, increased demand for power by the hydraulic load leads to stalling with the generated power output immediately dropping to zero.

The prior art does not have any mechanism to drop the power output from the turbine 10 to prevent stalling other than the aforementioned pitch adjusting mechanism. The ability to generate emergency power at the lower end of the speed range of the aircraft is critical in controlling an airplane during landing procedures when propulsion from the propulsion engines has been lost. The inability of the pilot to control control surfaces at speeds at which it is desired to land the airplane is likely to result in a crash with the attendant loss of life. The prior art has the deficiency of not extending the lowest velocity at which emergency power may be generated below the lowest speed at which the pitch adjustment mechanism permits the RAM air turbine to generate power.

The governor 16 functions to vary the pitch of the blades 12 in a manner which satisfies: the demand for hydraulic power placed upon the variable displacement hydraulic pump which outputs pressurized hydraulic fluid at the regulated pressure within the first rotational velocity range. The governor automatically adjusts the pitch of the blades 12 toward the finest setting to extract additional power from the RAM airstream intercepting the blades 12 as the demand for power goes up and/or the velocity of the aircraft decreases. When the demand for pressurized hydraulic fluid 20 for driving hydraulic loads exceeds the energy available from the RAM airstream when the blades 12 have been adjusted to their finest pitch for providing the maximum energy from the RAM airstream a dangerous stall condition exists at which the RAM air turbine 10 will cease to operate thereby preventing the generation of any emergency power.

Control of an aircraft could be maintained for velocities of the aircraft at which the pitch control mechanism cannot prevent stalling by the production of reduced power from the variable displacement hydraulic pump if a mechanism were provided to overcome the stalling of the blades 12 as a result of the inability of the governor 16 to prevent stalling.

U.S. Pat. No. 3,125,960 discloses a RAM air turbine for use in an aircraft. The RAM air turbine has a pitch control which varies the pitch of the blades of the RAM air turbine. A fixed displacement hydraulic pump is driven by the rotation of the blades. An unloading valve is used to unload the hydraulic pump until the blades reach a rotational velocity of approximately 1,000 rpm. An accumulator 32 is charged with pressurized hydraulic fluid produced by the turbine driving the fixed displacement hydraulic pump. A pressure regulator allows pressurized hydraulic fluid to be outputted after the accumulator reaches a predetermined pressure of 3,000 lbs. Spool valve 35 controls the porting of pumping pressure to govern the speed of the turbine. The pressure from the hydraulic pump is used to control the pitch of the blades to provide governing action to control the speed of rotation of the blades.

The RAM air turbine disclosed in U.S. Pat. No. 3,125,960 requires that the highest pump output be sized below the lowest turbine power producing capability for a rated airspeed. If a reduced airflow is encountered, such as that produced by a decreased airspeed in which it is critical to maintain control of flight surfaces, the governor of the RAM air turbine of the '960 patent will adjust the blades to the finest pitch condition in attempting to extract maximum power from the airstream and stall under full pumping load. No mechanism is provided in the RAM air turbine of the '960 patent to reduce the hydraulic power output to prevent stalling by an overload of power demanded from the turbine. This system functions to produce a regulated pressure output of hydraulic fluid similar to the operation of the prior art described with respect to FIG. 1.

RAM air turbines for generating emergency power on an airplane are disclosed in additional patents. See U.S. Pat. Nos. 3,149,678 and 4,717,095 and 4,742,976 assigned to the assignee of the present invention. None of these patents addresses the deficiency of the prior art in providing a mechanism for generating emergency power in a rotational velocity range of the blades of a RAM air turbine at which the pitch adjustment mechanism cannot prevent stalling.

Volumetric fuses are used in the prior art during starting to bypass the high pressure output of the variable displacement hydraulic pump driven by the RAM air turbine to the low pressure input for a predetermined volume of hydraulic fluid to unload the blades of the turbine to permit reaching the speed control range of the governor. Volumetric fuses are hydraulically complex, add weight and do not permit a determination of whether resetting has occurred. If resetting does not occur, the unloading of the blades will not occur which prevents starting of the RAM air turbine with potentially disastrous consequences.

DISCLOSURE OF INVENTION

The present invention provides an improved RAM air turbine and method of operation in which emergency power is produced for airspeeds below which stalling of the RAM air turbine would occur with the prior art. With the invention, reduced power is outputted by the RAM air turbine in a second rotational velocity range lower than the first rotational velocity range at which the governor controls the speed of rotation of the blades of the RAM air turbine. Emergency power is provided in the second rotational velocity range by controlling the displacement of a variable displacement hydraulic pump such that the level of hydraulic power produced by the variable displacement hydraulic pump does not stall the blades of the RAM air turbine. Displacement of the variable displacement hydraulic pump in a first rotational velocity range of the blades is controlled in accordance with a conventional stroking piston of the prior art and displacement of the variable displacement hydraulic pump in the second rotational velocity range is controlled by an anti-stall piston which is controlled by the output of a speed detector. The anti-stall piston functions as a variable stop for the stroking piston in the second rotational velocity range. The speed detector output controls the variable displacement hydraulic pump to produce constant output power of a variable flow rate and pressure of hydraulic fluid for any given rotational velocity within the second rotational velocity range. The constant power output produced by the variable displacement hydraulic pump for blade velocities within the second rotational velocity range provides for a reduced power output when compared to the power which may be outputted by the variable displacement hydraulic pump in the first rotational velocity range. The reduced power output may be used to control hydraulic loads such as flight control surfaces or a hydraulic motor driving an electrical power generator for generating emergency power necessary to control the aircraft at speeds below which heretofore the prior art RAM air turbines would stall.

With the invention, the displacement of the variable displacement hydraulic motor in the first and second rotational velocity ranges is controlled by two hydraulic signals. Control in the second rotational velocity range of the displacement of the variable displacement hydraulic pump to prevent stalling is by a second hydraulic control signal at least for rotation velocities within the second rotational velocity range. Control of displacement in the first rotational velocity range of the variable displacement hydraulic pump is by a first hydraulic control signal responsive to a high pressure hydraulic fluid output of the variable displacement pump. In the second rotational velocity range the second hydraulic control signal sets the position of the anti-stall piston with the first hydraulic control signal setting the quantity of hydraulic fluid pumped to a hydraulic load.

A RAM air turbine in accordance with the present invention operates by accelerating the blades from a stop through a third rotational velocity range, through the second rotational velocity range into the first rotational velocity range with the displacement of the variable displacement hydraulic pump being controlled in all three velocity ranges. In the third rotational velocity range, the displacement of the pump is reduced to a displacement equal to or less than a displacement at which the variable displacement hydraulic pump operates within the second rotational velocity range which preferably is zero by destroking the displacement control of the variable displacement hydraulic pump to the maximum extent under the control of an anti-stall piston controlled by a second hydraulic control signal. In the second rotational velocity range, the displacement of the hydraulic pump may be increased in proportion to the rotational velocity of the blades within the second rotational velocity range in response to the second hydraulic control signal to provide a variable stop. The first hydraulic control signal sets the quantity of pressurized fluid which is pumped. The displacement of the variable displacement hydraulic pump in the first rotational velocity range is controlled by a stroking piston controlled by a first hydraulic control signal generated in response to a high pressure hydraulic fluid output of the variable displacement hydraulic pump. The anti-stall piston does not reduce the displacement of the variable displacement hydraulic pump in the first rotational velocity range. The second hydraulic control signal has a pressure which is directly proportional to the rotational velocity of the blades and controls the displacement of the variable displacement hydraulic pump in the second and third rotational velocity ranges.

A power controller, which provides reduced power emergency generating capability in the second rotational velocity range at which the prior art RAM air turbines were not capable of producing any output power when compared to the emergency power generating capability in the first rotational velocity range, has a hydraulic pressure relief which functions to depressurize the coupling of the high pressure output from the variable displacement hydraulic pump from the displacement control of the hydraulic pump to the anti-stall piston in the event of a failure in generating a pressurized hydraulic output from a pump, driven by the turbine blades, used for controlling the generation of the second hydraulic control signal to control the anti-stall piston to control the displacement of the variable displacement hydraulic pump at least in the second rotational velocity range. The hydraulic pressure relief prevents the anti-stall piston from overriding the stroking piston displacement control of the variable displacement in the first rotational velocity range in the event of the aforementioned failure of the pump in producing the pressurized hydraulic output for controlling the generation of the second hydraulic control signal in controlling the displacement in the second rotational velocity range.

The variable displacement hydraulic pump includes a displacement control having an anti-stall piston which is responsive to the second hydraulic control signal for providing a variable stop varying the displacement of the variable displacement hydraulic pump for rotational velocities of the blades of the turbine in the second rotational velocity range and a stroking piston which is responsive to a first hydraulic control signal for varying displacement to the variable displacement hydraulic pump in the first rotational velocity range which produces pressurized hydraulic fluid to drive a hydraulic load during rotational velocities in the first rotational velocity range.

A RAM air turbine for use in generating power for an aircraft by driving a load from an airstream intercepting blades of the turbine as the aircraft moves through the air with the turbine applying power to the load during rotation of the blades in a first rotational velocity range and during rotation of the blades in a second rotational velocity range which is lower than the first rotational velocity range in accordance with the invention includes a variable displacement hydraulic pump which is driven by rotation of the blades, including a displacement control having an anti-stall piston which is responsive to a second hydraulic control signal for varying the displacement of the variable displacement hydraulic pump for rotational velocities of the blades in the second rotational velocity range and a stroking piston which is responsive to a first hydraulic control signal for varying displacement of the variable displacement hydraulic pump in the first rotational velocity range, for producing pressurized hydraulic fluid to drive a hydraulic load during rotational velocities in the first and second rotational velocity ranges; and wherein a reduced power output in the second rotational velocity range is produced when compared to power output which may be outputted in the first rotational velocity range with the driven load generating power for controlling the aircraft in the first and second rotational velocity ranges. The pistons are coaxial and retained in a coaxial bore. The anti-stall piston has a diameter which is larger than a diameter of the stroking piston; and the bore has a first section and a second section with the diameter of the first section being larger than a diameter of the second section with the second section stopping movement of the anti-stall piston. A hydraulic fluid source driven by rotation of the blades produces a pressurized hydraulic fluid output which varies in pressure in proportion to the rotational velocity of the blades with the second hydraulic control signal being generated in response to the pressurized hydraulic fluid output; and the first hydraulic control signal is generated in response to a high pressure hydraulic fluid output. The anti-stall piston is movable between first and second positions in response to the second hydraulic control signal which causes the stroking piston to move between first and second positions with the first position of the stroking piston producing a maximum displacement of the variable displacement hydraulic pump and the second position of the stroking piston producing a minimum displacement of the variable displacement hydraulic pump; and the stroking piston is movable between first and second positions independent of movement of the anti-stall piston in response to the first hydraulic control signal in the first rotational velocity range. The invention further includes a pressure regulator hydraulically coupled to a high pressure output of the variable displacement pump which couples pressurized hydraulic fluid from the high pressure output to a lower pressure to regulate the output pressure of the variable displacement hydraulic pump with the lower pressure being the first hydraulic control signal. The anti-stall piston is positioned in the first position during rotation of the blades in the first rotational velocity range.

BEST MODE FOR CARRYING OUT THE INVENTION

Figure 1:
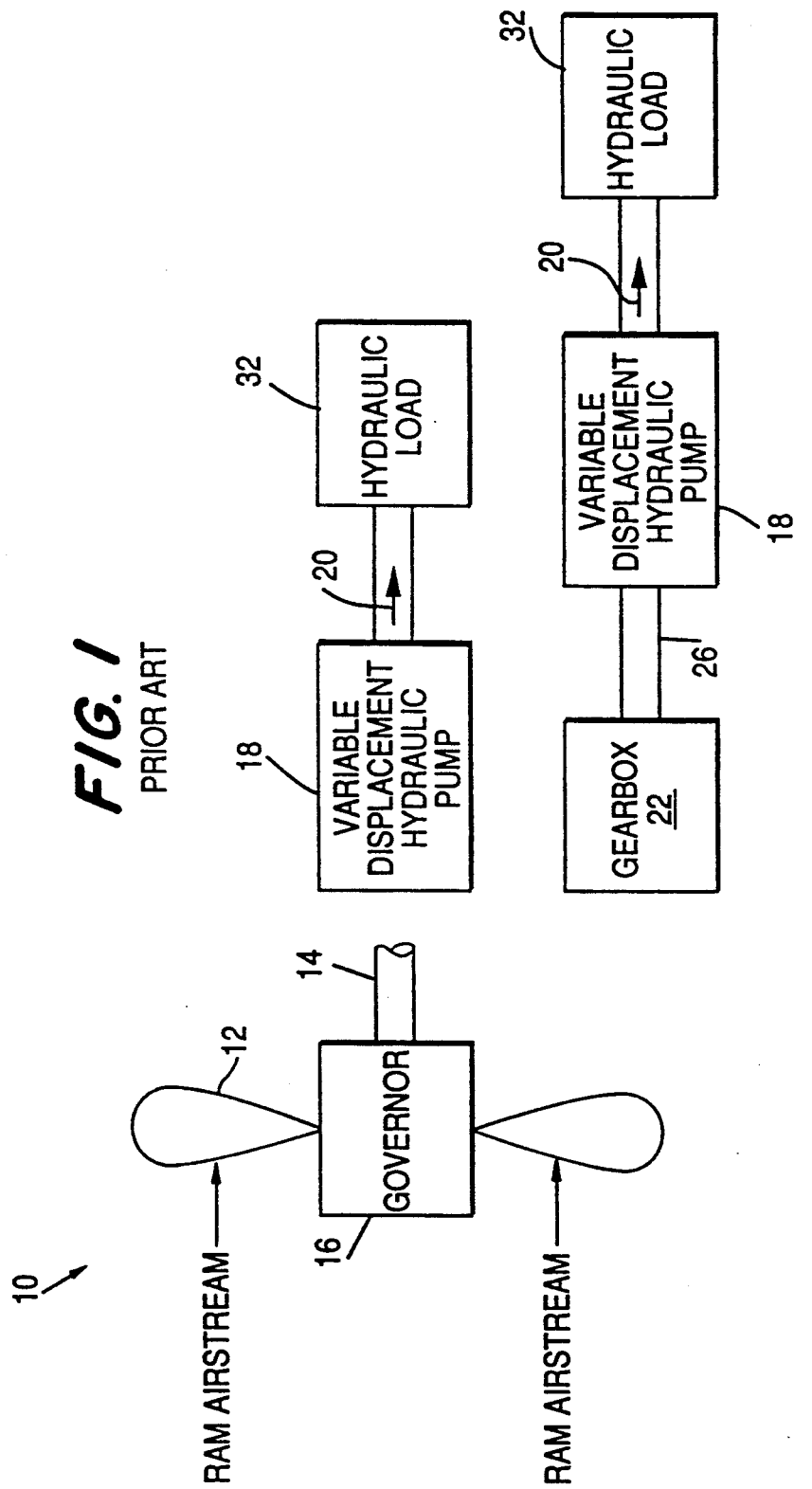
FIG. 1 illustrates prior art RAM air turbines used for generating emergency power on an airplane.
Figure 2:
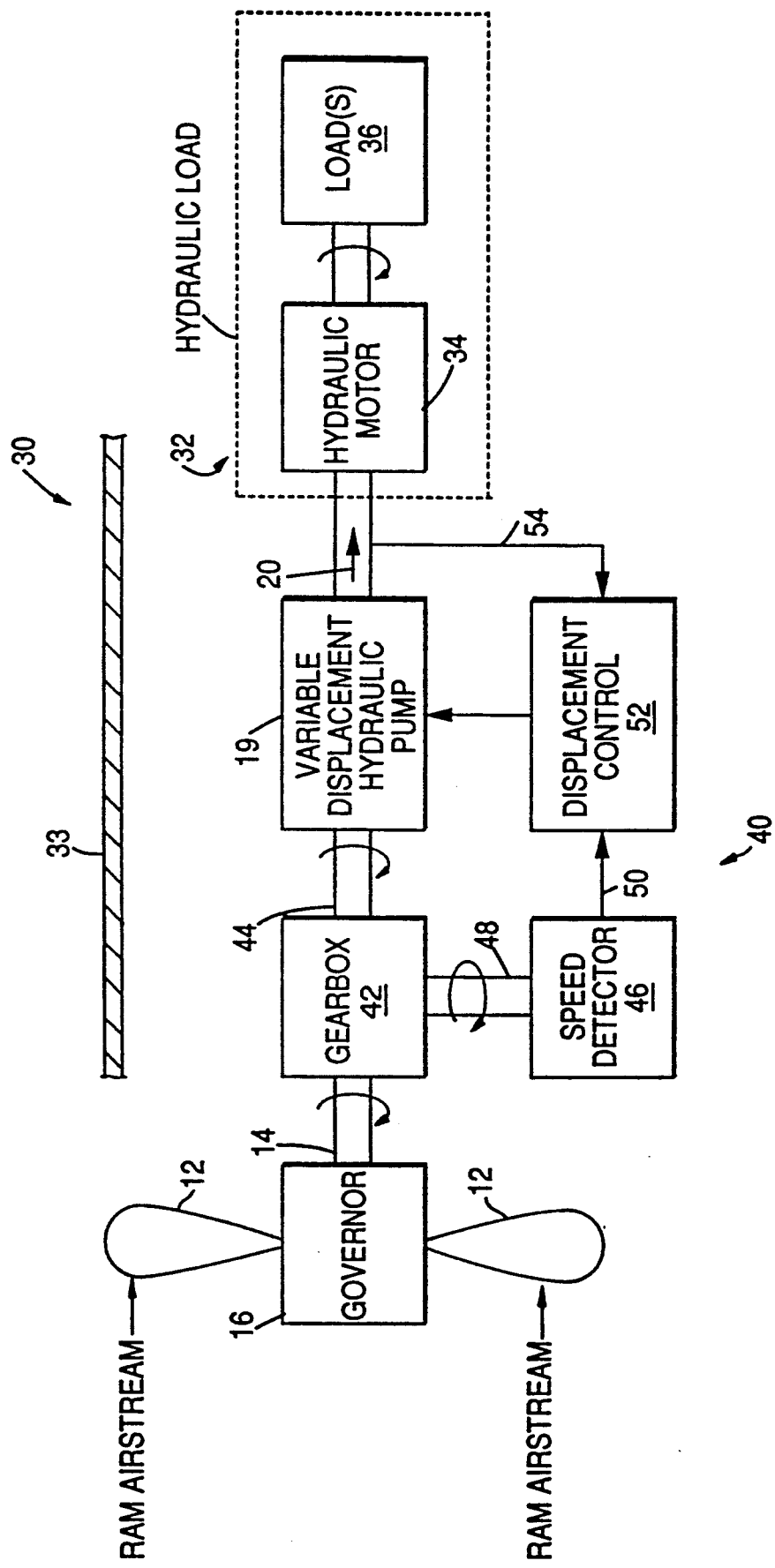
FIG. 2 illustrates a block diagram of an embodiment of the present invention.

FIG. 2 illustrates a block diagram of an embodiment 30 of a RAM air turbine in accordance with the present invention. Like reference numerals identify like parts in FIGS. 1 and 2. As illustrated, the RAM air turbine 30 is in the deployed position in which it has been pivoted from a stowed position in the fuselage identified schematically by reference numeral 33 to the deployed position as illustrated to intercept air on the blades 12 produced by motion of the airplane to cause rotation of the blades. It should be understood that the actual stowed and deployed positions are as illustrated in the assignee's commonly assigned U.S. Pat. Nos. 4,717,095 and 4,742,976. The pivoting mechanism for moving RAM air turbines between the stowed and deployed positions may be in accordance with the pivoting mechanism of U.S. Pat. Nos. 4,717,095 and 4,742,976 which are incorporated herein by reference in their entirety. The velocity of the airplane in moving through the air produces the RAM AIRSTREAM. The variable displacement hydraulic pump 19 functions to produce pressurized hydraulic fluid 20 which is applied to a hydraulic load 32. The hydraulic load 32 may be any hydraulic load utilized in an airplane such as, but not limited to, a hydraulic actuator for moving of flight control surfaces or a hydraulic motor which is driven by the pressurized hydraulic fluid 20 to drive a load 36 which may be an electrical generator for generating emergency electrical power.

The operational characteristic of the RAM air turbine 30 differs from the prior art of FIG. 1 in that hydraulic power is generated for a second rotational velocity range of the blades 12 below which the governor 16 cannot prevent stalling from occurring. While not limited thereto, in a preferred embodiment of the present invention, the second rotational velocity range is between 4600–5250 rpm in which the variable displacement hydraulic pump 19 produces a constant power output of hydraulic fluid 20 varying in pressure in accordance with the power characteristics of FIG. 5 described below. The power which may be applied from the rotation of the blades 12 to the hydraulic load 32 is less than the maximum power which may be applied to the hydraulic load during rotation of the blades in a first rotational velocity range. While not limited thereto, in the present invention the first rotational velocity range is above 5250 rpm. The first rotational velocity range is controlled by the operation of the governor 16 in varying the pitch of the blades 12 in association with the operation of a pressure regulator contained within the variable displacement hydraulic pump 19 as generally in the prior art. The invention's production of useful hydraulic power from the variable displacement hydraulic motor 19 in the second rotational velocity range, from which no useful power was produced in the prior art, provides the pilot of an airplane in an emergency situation with a constant power output of a magnitude which is reduced in comparison to the power which may be drawn for rotation of the blades 12 within the first rotational velocity range. This power prevents flying with no flight controls for velocities of the airplane producing rotational velocities of the blades in the second rotational velocity range with the resultant tremendous dangers.

The RAM air turbine 30 has a power controller 40, driven by rotation of the blades, for controlling power applied from the blades to the load as a function of airplane velocity in the second rotational velocity range below the first rotational velocity range. It is important to note that the operation of the invention in the second rotational velocity range under the control of the power controller 40 is independent of the operation of the invention in the first rotational velocity range. Therefore, as explained in detail below with reference to FIG. 7, failure of the speed detector 46 of the power controller 40 does not disable the generation of emergency power in the first rotational velocity range. The power controller 40 is comprised of a gearbox 42 which supplies torque to the variable displacement hydraulic pump 19 by means of drive shaft 44, a speed detector 46, which is driven by torque applied from gearbox 42 through drive shaft 48 producing a control output 50 of pressurized hydraulic fluid applied to a displacement control 52 controlling the displacement of the variable displacement hydraulic pump 19 in the second rotational velocity range. Pressurized hydraulic fluid 54 applied to the displacement control 52 controls the displacement of the variable displacement hydraulic pump 18 in the first rotational velocity range. The pressurized hydraulic fluid output 50 from the speed detector 46 commands the displacement of the variable displacement hydraulic pump 19 to be reduced to zero for a third rotational velocity range of the blades 12 which extends from stop up to the minimum velocity of the second rotational velocity range which in the preferred embodiment of the present invention is 4600 rpm. The hydraulic power provided by the pressurized hydraulic fluid 20 from the variable displacement hydraulic pump 19 in the second rotational velocity range enables the pilot of an airplane to have power useful for controlling the flight control surfaces down to an airspeed of approximately 96 knots equivalent airspeed whereas the prior art RAM air turbine of FIG. 1 was subject to stall at approximately 125 knots equivalent airspeed. The increased margin of safety provided to a pilot by providing reduced emergency power at velocities close to the stall velocity of the aircraft substantially reduces the possibility of a "dead stick" in the speed ranges between 100–125 knots to provide an increased margin of safety to the pilot.

Figure 3:
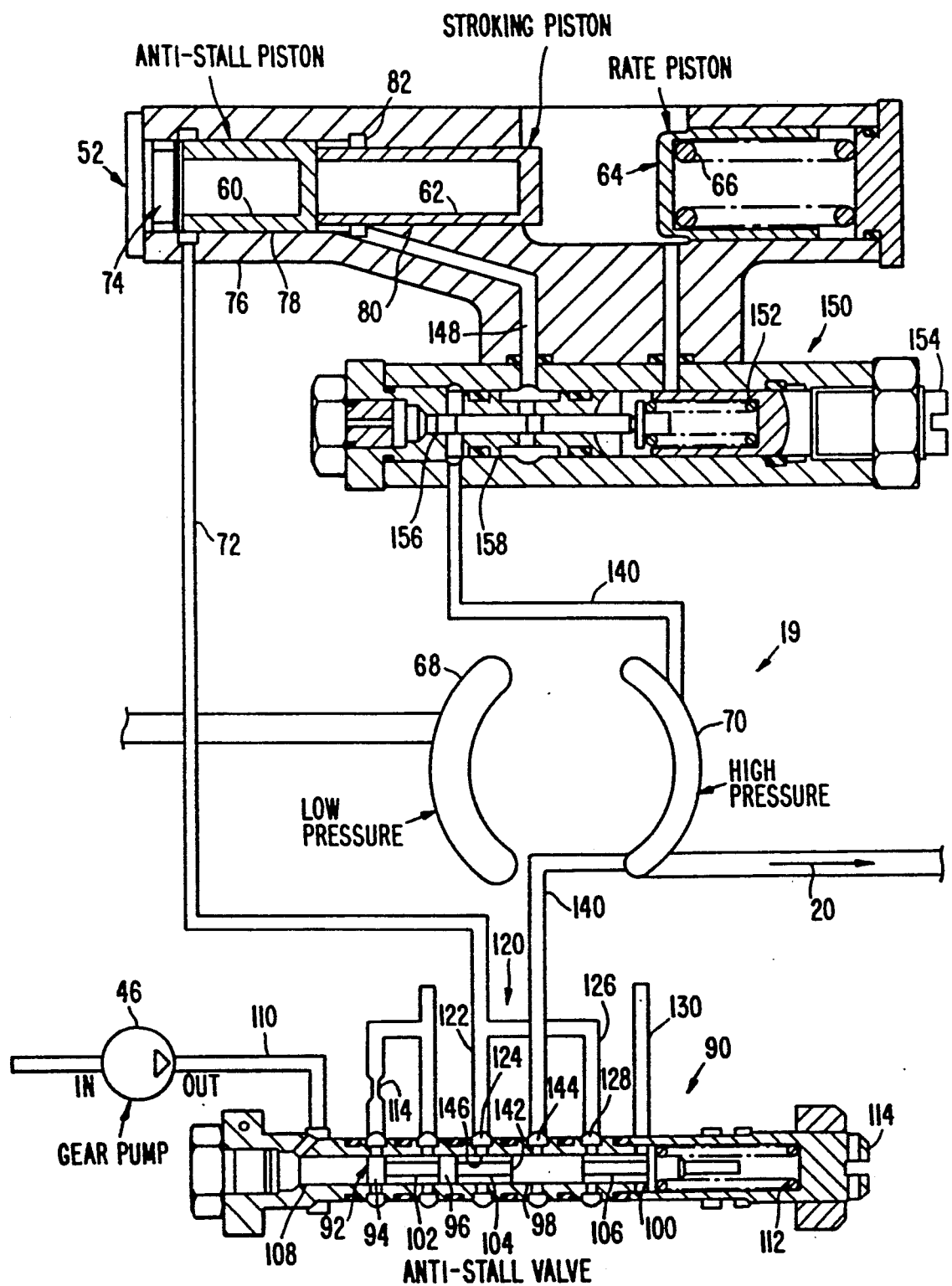
FIG. 3 illustrates the variable displacement hydraulic pump used in accordance with the present invention.

FIG. 3 illustrates a block diagram of the variable displacement pump 19, speed detector 46 and displacement control 52 of the RAM air turbine 30 of the present invention. Like reference numerals identify like parts in FIGS. 2 and 3. The displacement control 52 is comprised of an anti-stall piston 60 which is movable between a first position as illustrated in FIG. 3 and a second position located to the right with respect to FIG. 3, a stroking piston 62, which is movable between a first position, as illustrated in FIG. 3, and a second position located to the right with respect to FIG. 3 and a rate piston 64 which contacts a wobble plate (illustrated in FIG. 4) and applies force resisting the force applied by spring 66 to vary the displacement of the variable displacement hydraulic pump 19 which has a low pressure inlet 68 and a high pressure outlet 70. The variable displacement hydraulic pump 19 is conventional and is only illustrated schematically with respect to the low pressure inlet 68 and the high pressure outlet 70. The stroking piston 62 is movable independently of the anti-stall piston 60 in the first rotational velocity range. Movement of the anti-stall piston 60 during the second rotational velocity range under the control of a second hydraulic control signal applied on a second hydraulic control circuit 72 to the right with respect to FIG. 3 reduces the displacement of the variable displacement hydraulic pump 19. The anti-stall piston 60 provides a variable stop for the control of pressurized hydraulic fluid which may be delivered under the control of the stroking piston 62 which controls the displacement of the variable displacement hydraulic pump 19 under the control of the first hydraulic control signal on hydraulic line 148 as described below. Movement of the anti-stall piston 60 forces the stroking piston 62 outward from its recessed position within bore 74 within the body 76. The bore 74 has a first section 78 and a second section 80 which are coaxial. The diameter of the first section 78 is larger than the diameter of the second section 80. The bottom 82 of the first section 78 stops movement of the anti-stall piston 60. The stroking piston 62 moves independently of the anti-stall piston 60 and extends to the right from the position of FIG. 3 in reducing the displacement of the variable displacement hydraulic pump 19 from the maximum displacement as illustrated during rotational of the blades 12 in the first and second rotational velocity ranges. In the first rotational velocity range the anti-stall piston 60 is fixed in the position as illustrated in FIG. 3. In the second rotational velocity range, the anti-stall piston 60 varies from its first position with a maximum stop permitting maximum displacement to a minimum stop which produces minimum displacement (zero). The second hydraulic control signal, which controls the movement of the anti-stall piston 60 between the first and second positions, is controlled by spool valve 90 which contains an axially movable spool 92 having lands 94–100. Lands 94 and 96 are connected by section 102 having a reduced diameter which permits hydraulic fluid flow between the lands. Similarly, lands 96 and 98 are connected by section 104 which permits hydraulic fluid flow between the lands. Finally, lands 98 and 100 are connected by section 106 which permits hydraulic fluid flow between the lands. The speed detector 46 is a gear pump which pressurizes hydraulic fluid from case pressure to a high pressure output which is connected to the bore 108 within the spool valve 90 by fluid coupling 110. A spring 112, which has an adjustable compression adjusted by turning fitting 114, biases the spool to the left. Rotation of the blades 12 causes rotation of the speed detector 46 through the torque coupling 48 of FIG. 1 to pressurize hydraulic fluid at the output of the gear pump with a pressure which is directly proportional to the rotational velocity of the blades 12. It should be noted that the gearbox 42 drives the variable displacement hydraulic pump 19 with a slightly different velocity than the rotational velocity of the input 14 with the difference being approximately 100 rpm at 5250 rpm of the blades 12. The gear pump 46 produces a pressurized hydraulic fluid output which varies in pressure in proportion to the rotational velocity of the blades which produces a force acting on the spool 92 to the right to cause movement of the spool to produce compression of the spring 112. The degree of movement controls the generation of the second hydraulic control signal applied to the anti-stall piston by the second hydraulic control circuit 72, the first hydraulic control signal applied to the stroking piston 62 through the first hydraulic circuit 148 and the commanding of the displacement of the variable displacement hydraulic pump 19 to the maximum displacement stop within the second rotational velocity range when the gear pump 46 fails as discussed below. The orifice 114 develops a pressure differential across the respective ends of the spool 92 which is equal to the difference between the high pressure output from the gear pump 46 and the inlet pressure at the inlet 68 of the variable displacement hydraulic pump 19. The pressure differential across orifice 114 produces a high speed response in the spool 92 in moving in response to increased rotational velocity of the blades 12 which provides high speed pressure changes in response to changing hydraulic load conditions. The function of the lands 94–100 is described in detail below. The second hydraulic circuit 72 contains a bifurcation 120 with a first part 122 connected to a first axial position 124 of the bore 108 of the spool valve 90 in which the spool 92 moves and a second part 126 connected to a second axial position 128 separated from the first axial position by an axial displacement. The second section 126 functions to bleed high pressure hydraulic fluid trapped in the second hydraulic circuit 72 which is produced by the high pressure output 70 being coupled to the second hydraulic circuit within the second rotational velocity range when the gear pump 46 fails. In this situation, the trapped high pressure hydraulic fluid within the second hydraulic circuit 72 bleeds from the first hydraulic circuit to the case pressure across the axial displacement by bypassing the land 98 to a hydraulic circuit 130 which is connected to the inlet 68 of the variable displacement hydraulic pump 19. As a result, the system will operate in accordance with the prior art which permits emergency power to be generated in the first rotational velocity range.

The movement of the spool 92 in response to the pressurized hydraulic fluid output from the gear pump 46 to the right in generating the second hydraulic control signal applied to the anti-stall piston 60 in the third rotational velocity range is described as follows. For speeds from zero to 4600 rpm, the spool 92 moves a distance axially within the bore 108 of the spool valve 90 which is proportional to the pressure of the pressurized hydraulic fluid output from the gear pump 40. Movement of the spool 92 to the right, in response to the pressurized hydraulic fluid output from the gear pump 46, within the bore 108 of the spool valve 90 connects high pressure hydraulic fluid circuit 140, which is connected to the high pressure outlet of the variable displacement hydraulic pump 19, to the second hydraulic fluid circuit 72 when the edge 142 of the land 98 moves to the right sufficiently to be at least axially aligned with the axial position 144 at which the high pressure hydraulic circuit 140 is connected to the bore 108 of the spool valve 90. At this position and positions to the right, the spool 92 permits fluid flow in the reduced diameter section 104 between the high pressure output 70 through hydraulic circuit 140 to the first hydraulic circuit 72 to cause the anti-stall piston 60 to move from the first position to the second position commanding zero displacement for the variable displacement hydraulic motor 19. The spool 92 moves proportionally to the right as the rotational velocity of the blades 12 increases.

When the rotational velocity of the blades 12 reaches the lowest speed in the second rotational velocity range, the right hand part of the land 96 is located just to the left of the axial position 124 in a first position. As the rotational velocity of the blades 12 within the second rotational velocity range increases, the land 96 moves from the first position to the right toward a second position to begin to occlude the inlet port 146 of the second hydraulic circuit 72 to proportionally reduce the pressure of the hydraulic coupling between the high pressure outlet 70 of the variable displacement hydraulic pump 19 and the anti-stall piston 60. The anti-stall piston 60 is positioned in a second stop position causing the stroking piston 62 to be positioned at the second position to command a zero flow rate from the variable displacement hydraulic motor 19 as the land 96 begins to occlude the inlet port 146. The pistons 60 and 62 proportionally move from a second position commanding the minimum displacement (zero) to their first position which commands the maximum displacement stop of the variable displacement hydraulic pump in proportion to the degree of occlusion of the inlet port 146 by the land 96. At the lower limit of the first rotational velocity range, the pistons 60 and 62 are positioned in their first position to command a maximum displacement stop of the variable displacement hydraulic pump 19 and the land 96 is located in its second position.

For rotational velocities within the first rotational velocity range of the blades 12, the anti-stall piston 60 is withdrawn to its first position with a maximum displacement stop. A first hydraulic control signal applied on the first hydraulic circuit 148 to the stroking piston 62 controls the displacement of the variable displacement hydraulic motor 19 in proportion to the difference in pressure between the high pressure output 70 of the variable displacement hydraulic pump and a lower pressure present in the first hydraulic circuit produced by the pressure regulator 150. The pressure regulator 150 contains a spring bias 152 having an adjustable compression which is adjusted by turning of threaded member 154. The high pressure hydraulic fluid output form the high pressure output 70 of the variable displacement hydraulic motor 19 is bled to a lower pressure which is the first hydraulic control signal within the first hydraulic circuit 148 under the action of the pressure regulator 150. The movable member 156 moves axially within the bore 158 of the pressure regulator 150 to bleed a portion of the high pressure hydraulic fluid from the high pressure output 70 to a lower pressure to produce a first hydraulic control signal which is the pressure for controlling the displacement of the stroking piston to vary the displacement of the variable displacement hydraulic motor 19. The displacement of the variable displacement hydraulic pump 19 in the first operational range is controlled by the pressure drop between the high pressure output 70 of the variable displacement hydraulic pump and the pressure of the second hydraulic control signal which varies under the action of the bias applied by spring 152 in regulating the output pressure. The pressure regulator 150 controls the pressure in the output 70 of the variable displacement hydraulic motor within a narrow range such as, but not limited to, 3,000–3,200 psi.

Figure 4:
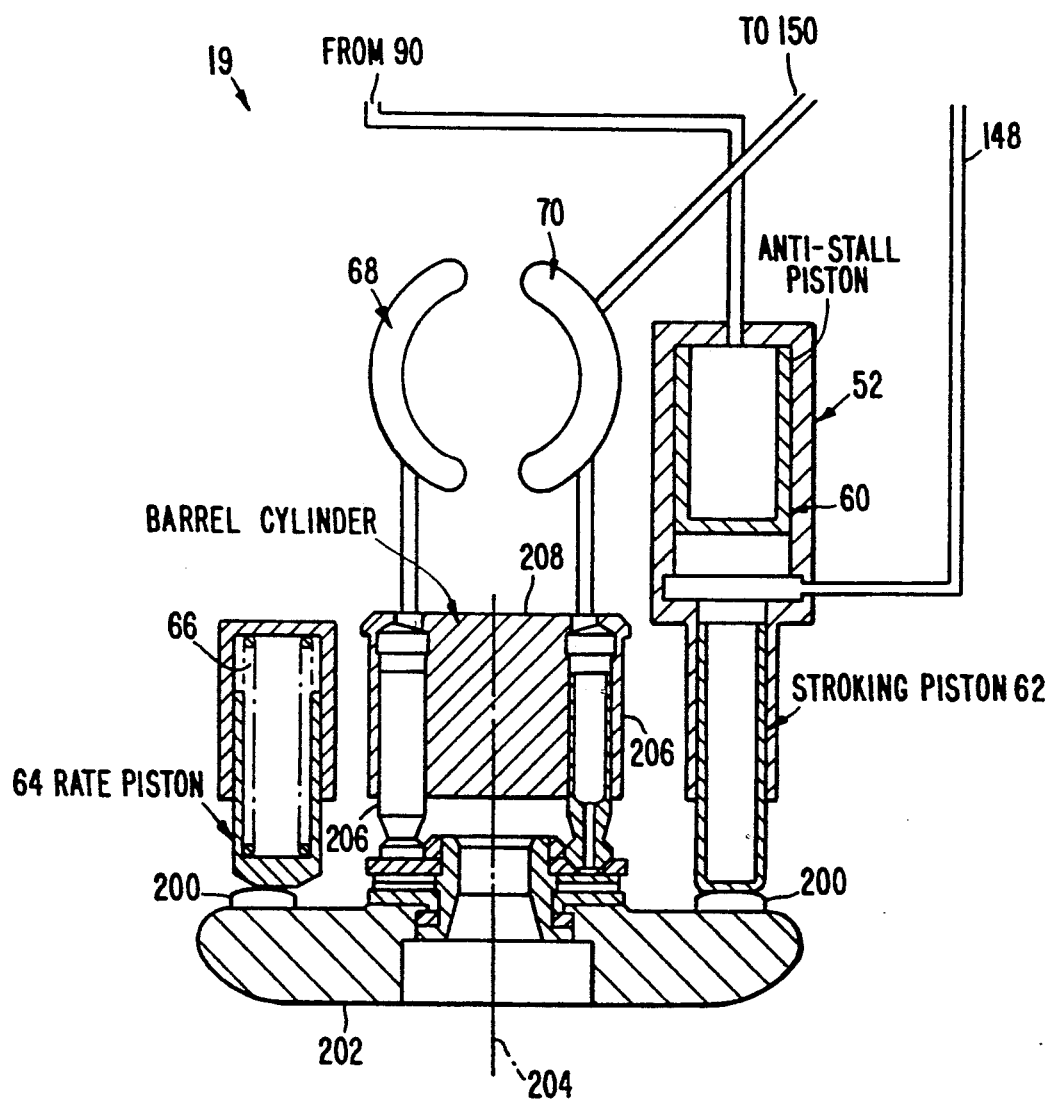
FIG. 4 illustrates the displacement control for the variable displacement hydraulic pump in accordance with the present invention.

FIG. 4 illustrates the displacement control mechanism for the variable displacement hydraulic pump 19 utilized with the present invention. Like reference numerals identify like parts in FIGS. 2–4. FIG. 4 illustrates the displacement of the variable displacement hydraulic pump 19 reduced to zero during rotation of the blades 12 in the first rotational velocity range. The stroking piston 62 rides on a slipper 200 attached to one end of a wobbler 202. The rate piston 64 rides on a slipper 200 attached to an opposed end of the wobbler which applies force through the action of compression of spring 66 against the extension of the stroking piston 62 caused by the first hydraulic control signal. The wobbler 202 pivots about axis 204 in a conventional manner. The displacement of the variable displacement hydraulic pump is proportional to the angle of inclination of the wobbler 202 with respect to the axis of rotation 204. The maximum displacement of the variable displacement hydraulic pump 19 occurs when the anti-stall piston 60 is fully withdrawn into the body 52 torching the bottom end of the stroking piston 62. Pistons 206 sweep out bores within the barrel cylinder 208 to pressurize hydraulic fluid from a low pressure inlet 68 to a high pressure outlet 70 which is carried in a port plate (not illustrated) in a conventional manner. During operation in the second rotational velocity range, the anti-stall piston 60 moves from the position as illustrated to an extended position which forces the stroking piston 62 outward to vary the displacement of the variable displacement hydraulic pump 19 from a maximum displacement stop to a minimum displacement stop as illustrated in FIG. 4 with it being understood that the anti-stall piston is in contact with the stroking piston in this mode of operation. The variation in the maximum displacement stop in the second rotational velocity range is proportional to the rotational velocity of the blades 12.

Figure 5:
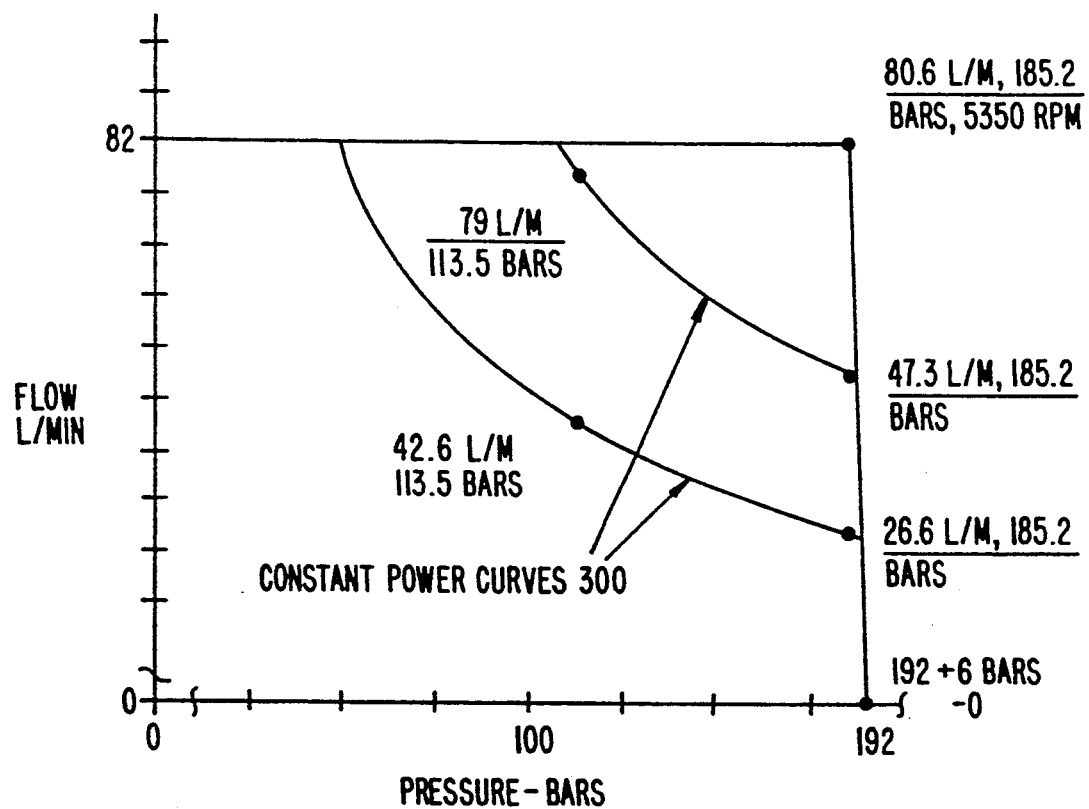
FIG. 5 illustrates the constant power output characteristic of a RAM air turbine in accordance with the present invention which is operated in the second rotational velocity range.

FIG. 5 illustrates the operational characteristic of the variable displacement hydraulic motor 19 within the second rotational velocity range. The ordinate is in units of liters per minute of hydraulic fluid and the abscissa is in terms of pressure units of bars with each bar being equal to one atmospheric pressure. The constant power curves produced by the operation of the controller 40 of FIG. 5 are from speeds of 4650–5350 rpm of the variable displacement hydraulic pump 19. It should be understood that the pump is driven by the gearbox 42 with a gear ratio slightly greater than 1 with the blade speed at 5350 rpm of the variable displacement hydraulic pump 19 being 5250 rpm in a preferred embodiment of the present invention. The pressure regulator 150 functions in conjunction with the operation of the anti-stall and stroking pistons 60 and 62 to provide pressurized hydraulic fluid at the high pressure output 70 of the variable displacement hydraulic pump 19 having constant power for each velocity within the second rotational velocity range. For each velocity within the second rotational velocity range, the power controller 40 produces a constant power curve 300. FIG. 5 only illustrates two constant power curves 300 of a whole family of curves with it being understood that each distinct velocity within the second rotational velocity range has its own unique constant power curve 300.

The control characteristic 300 produced by the power controller 40 within the second rotational velocity range represents a reduced power output, when compared to the maximum power which could be produced by the variable displacement hydraulic pump 19 within the first rotational velocity range, which was not available in the prior art. The constant power curves 300 in the second rotational velocity range of the blades 12 represent the output of useful power for controlling flight surfaces and/or generating electric power in velocity ranges at which a stall condition would have occurred in the prior art. Each constant power curve 300 has a decreasing flow rate as the pressure of the hydraulic fluid increases which is applied to the hydraulic load 32.

Figure 6:
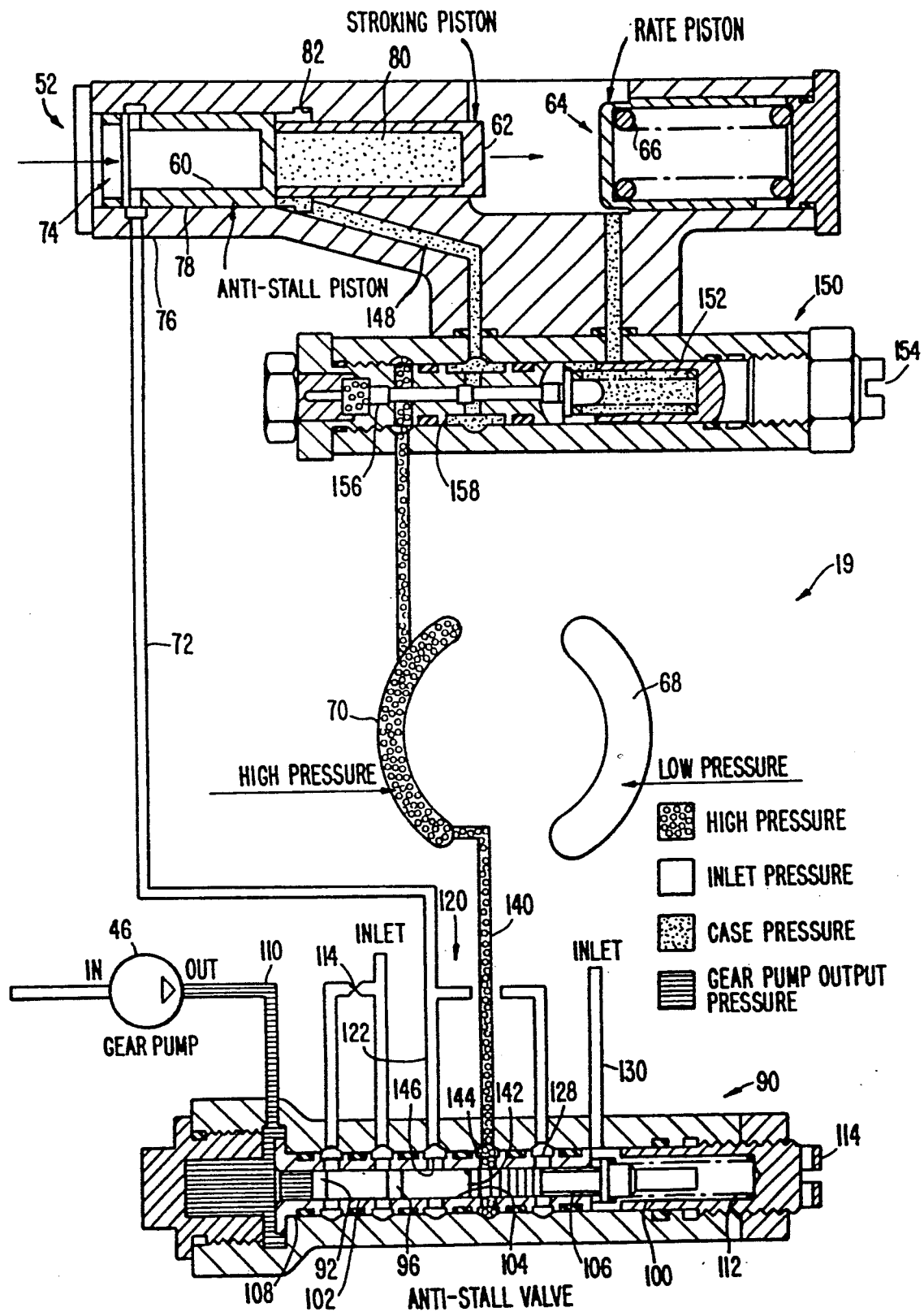
FIG. 6 illustrates the operation of the variable displacement hydraulic pump of the present invention for speeds in the third rotational velocity range.

FIG. 6 illustrates the operation of the variable displacement hydraulic pump 19 at zero rpm for blade velocities within the third rotational velocity range which in a preferred embodiment of the present invention is from zero to 4600 rpm at which the blades 12 are not coupled to the variable displacement hydraulic pump 19 for producing emergency power so as to permit the blades to attain a velocity within the second rotational velocity range. The variable displacement hydraulic pump 19 operates in the off loaded rotational velocity range without the volumetric fuse of the prior art. The present invention uses the power controller 40 to control the generation of emergency power in the second rotational speed range and performs the function of the prior art volumetric fuse with the power controller 40 for operation in the third rotational velocity range thereby eliminating the problems of the volumetric fuse as discussed above. Like reference numerals identify like parts in FIGS. 3 and 6. Hydraulic pressure at various points within FIG. 6 is encoded with the key in the bottom right-hand corner. As the rotational velocity of the blades 12 increases the output pressure from the gear pump 46 on output 110 increases proportionately. The increased pressure forces the spool 92 to the right. When the edge 142 of land 98 moves past axial position 144, high pressure hydraulic fluid is coupled from the output 70 through reduced diameter section 104 between lands 96 and 98 to the second hydraulic line 72 to cause the anti-stall piston 60 and the stroking piston 62 to move all the way to the right to cause the displacement of the variable displacement hydraulic pump 19 to be set to zero. With respect to FIG. 4 the anti-stall piston 62 would move downward into contact with the stroking piston 62 to cause the wobbler plate 202 to assume the position as illustrated. As the rotational velocity of the blades 12 increases, the spool 92 moves proportionately to the right. At 4600 rpm, the land 96 begins to occlude the inlet to the second hydraulic control line 72 which causes the anti-stall piston 60 and the stroking piston 62 to move from a fully extended position (not illustrated) wherein the displacement of the variable displacement hydraulic pump 19 is at a minimum (zero) toward the position, as illustrated in FIG. 6, which represents the position of the first and second hydraulic control pistons below 300 rpm.

Figure 7:
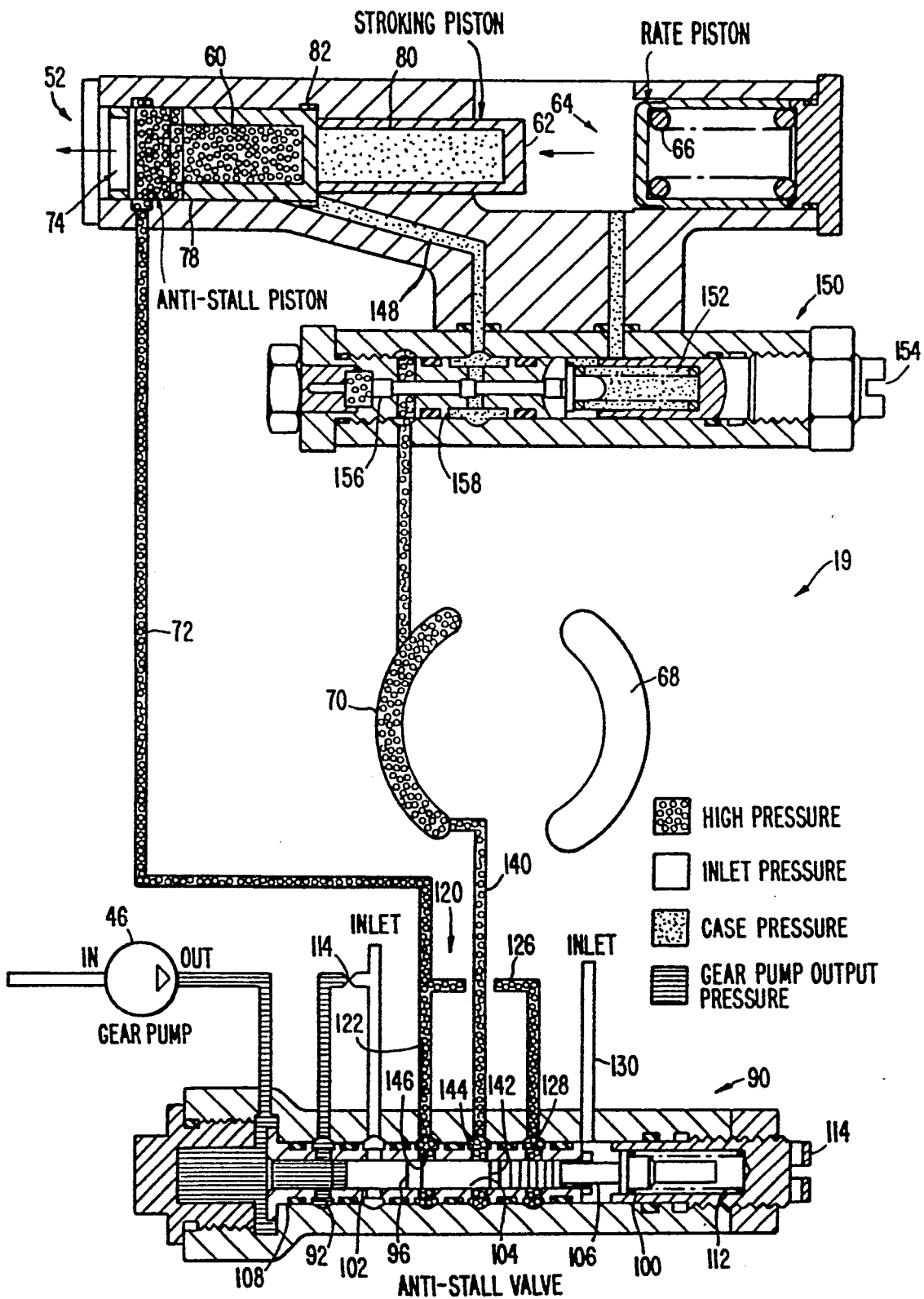
FIG. 7 illustrates the operation of the variable displacement hydraulic pump of the present invention in the second rotational velocity range.

FIG. 7 illustrates the operation of the variable displacement hydraulic pump 19 at 4600 rpm for blade velocities within the second rotational velocity range which in a preferred application of the present invention is between 4600-5250 rpm. This is the range of rotational velocities in which useful power is outputted from the variable displacement hydraulic motor 19 under the control of the power controller 40 at a rate which is less than the power which may be outputted by the variable displacement hydraulic pump in the first rotational velocity range and which is power which was not available in the prior art as a consequence of stalling of the blades 12 because of the inability of the governor 16 to reduce the coupling of power produced by the blades to the hydraulic load 32. Like reference numerals identify like parts in FIGS. 3, 6 and 7. Movement of the anti-stall piston 60 and the stroking piston 62 is bidirectional in the second rotational velocity range. As illustrated with the velocity of the blades being at the minimum velocity in the second rotational velocity range the movement of the anti-stall piston 60 and the stroking piston 62 is to the left as indicated by the single direction arrows pointing to the left for both pistons. The output power is in accordance with the constant power curves of FIG. 5 discussed above. As the rotational velocity of the blades 12 increases from 4600 rpm, the land 96 begins to occlude the inlet port 146 to cause a drop in pressure in the second hydraulic control line 72 which causes the displacement stop of the variable displacement hydraulic pump 19 to be increased from zero at 4600 rpm until it reaches its maximum displacement stop at 5250 rpm. The pressure regulator 150 functions in conjunction with the variation in the displacement stop of the variable displacement hydraulic pump to cause the constant power characteristic of the curves 300 as described above with respect to FIG. 5 to be produced for the speed at which the airplane is flying with the hydraulic demand represented by the hydraulic load 32 causing the flow rate and pressure to vary in accordance with the constant power curves. At 5250 rpm, the control of the displacement of the variable displacement hydraulic pump is no longer under the control of the second hydraulic control line 72 as a consequence of the inlet pressure being coupled to the second hydraulic control line through the reduced diameter section 102 of the spool 92.

Figure 8:
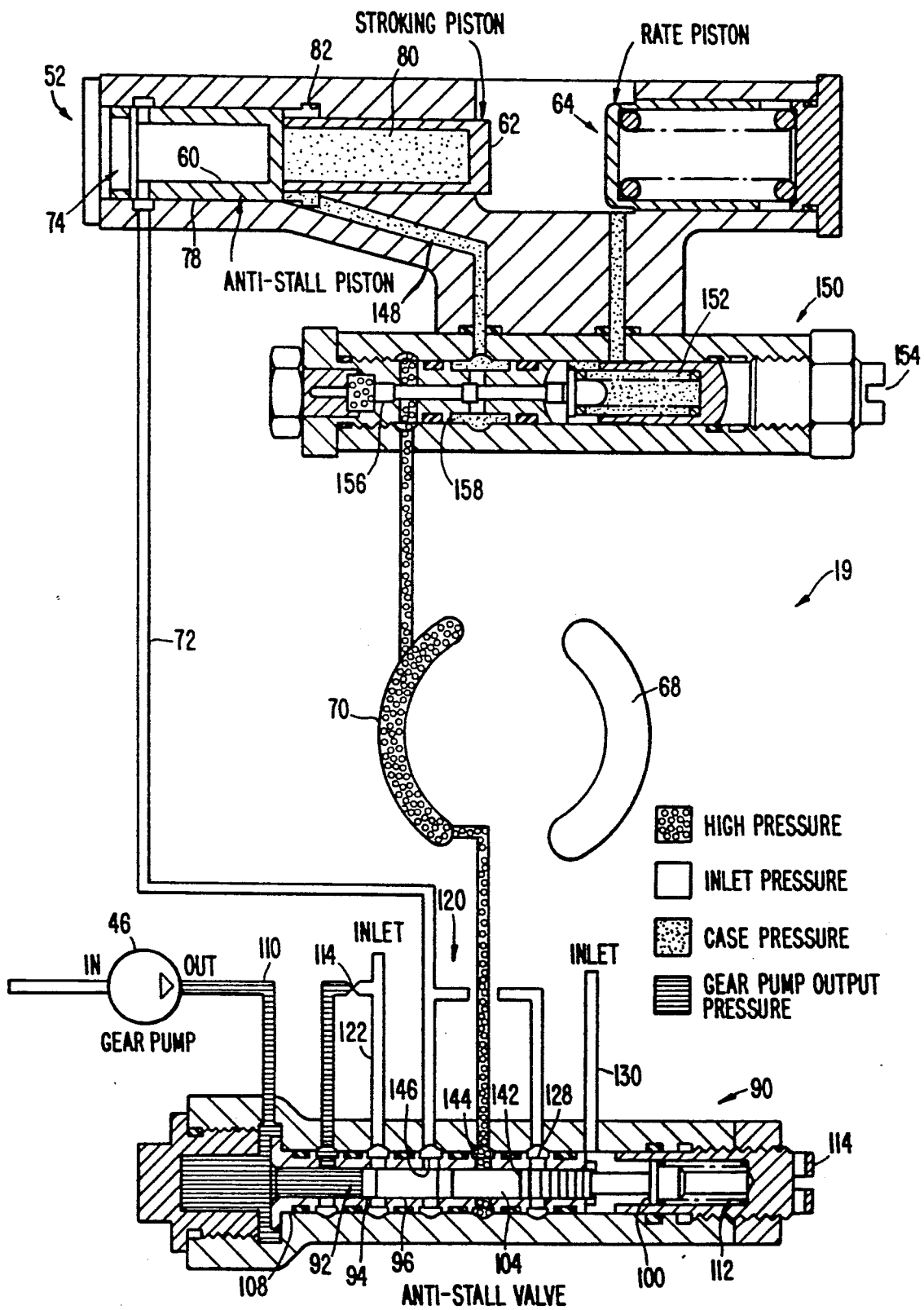
FIG. 8 illustrates the operation of the variable displacement hydraulic pump in accordance with the present invention for speeds in the first rotational velocity range.

FIG. 8 illustrates the operation of the variable displacement hydraulic pump 19 in the first rotational velocity range which in a preferred application of the present invention is above 5250 rpm with the stroking piston 62 being positioned at maximum displacement. In the first rotational velocity range, the governor 16 in combination with the pressure regulator 150 controls the operation of the system such that the pitch of the blades 12 and the pressure of the hydraulic fluid outputted on the high pressure output 70 is within a specified pressure range, such as between 3,000-3,200 psi. In this operational range of velocities of the blades 12 the stroking piston 62 moves independently outward from the anti-stall piston as illustrated in FIG. 4 wherein the anti-stall piston is fully withdrawn into the bore 78 as illustrated in FIG. 8. The anti-stall piston 60 does not move from the first position as illustrated during operation within the third speed range. The position of the anti-stall piston 62 varies from the first position as illustrated in FIG. 8 wherein a maximum displacement of the variable displacement hydraulic pump 19 is produced to a second position in which the stroking piston 62 is fully extended as illustrated in FIG. 4 wherein zero displacement of the variable displacement hydraulic pump is produced. The movement of the stroking piston 62 is illustrated by the single one direction arrow pointing to the left from the stroking piston. The demands placed on the variable displacement hydraulic pump 19 by the hydraulic load 32 cause the stroking piston 62 to vary in between the first and second positions. The variation between the first and second positions is a function of the pressure drop from the output of the high pressure outlet 70 to case pressure which is the hydraulic control signal for the stroking piston 62. The displacement of the variable displacement hydraulic pump 19 in the first rotational velocity range is inversely proportional to the pressure drop between the high pressure output 70 and case pressure which is produced by the operation of the spool 158 within the pressure regulator 150. Movement of the spool 158 in response to the change in output pressure on the outlet 70 causes the pressure drop between the high pressure output and case pressure to vary which modulates the position of the stroking piston 62 in a manner inversely proportional to the pressure. The anti-stall piston 60 does not move from the position as illustrated in FIG. 8 during operation within the first rotational velocity range as a consequence of the governor 16 and the pressure regulator 150 controlling the coupling of power from the variable displacement hydraulic motor 19 to the hydraulic load 32.

The larger diameter of the anti-stall piston 60 in comparison to the diameter of stroking piston provides for the anti-stall piston to have a quick response to small pressure differences between the first and second hydraulic control signals. As a result, the displacement of the variable displacement hydraulic pump is rapidly varied to prevent stalling and production of constant power in accordance with the constant power characteristics 300 of FIG. 5.

While the invention has been described in terms of its preferred embodiments, it should be understood that numerous modifications may be made thereto without departing from the spirit and scope of the invention as defined in the appended claims. It is intended that all such modifications fall within the scope of the appended claims.

We claim:

1. A ram air turbine for use in generating power for an aircraft by driving a load with an airstream intercepting blades of the turbine as the aircraft moves through the air with the turbine applying power to the load during rotation of the blades in a first rotational velocity range and during rotation of the blades in a second rotational velocity range which is lower than the first rotational velocity comprising:
   a variable displacement hydraulic pump which is driven by rotation of the blades, including a displacement control having an anti-stall piston which is responsive to a second hydraulic control signal for varying the displacement of the variable displacement hydraulic pump for rotational velocities of the blades in the second rotational velocity range and a stroking piston which is responsive to a first hydraulic control signal for varying displacement of the variable displacement hydraulic pump in the first rotational velocity range, for producing pressurized hydraulic fluid to drive a hydraulic load during rotational velocities in the first and second rotational velocity ranges; and wherein
   a reduced power output in the second rotational velocity range is produced when compared to power output which may be outputted in the first rotational velocity range with the driven load generating power for controlling the aircraft in the first and second rotational velocity ranges.

2. A ram air turbine in accordance with claim 1 wherein:
   the pistons are coaxial.

3. A ram air turbine in accordance with claim 2 wherein:
   the pistons are retained in a coaxial bore.

4. A ram turbine in accordance with claim 3 wherein:
   the anti-stall piston has a diameter which is larger than a diameter of the stroking piston; and
   the bore has a first section and a second section with a diameter of the first section being larger than a diameter of the second section with the second section stopping movement of the anti-stall piston.

5. A ram air turbine in accordance with claim 1 wherein:
   a hydraulic fluid source driven by rotation of the blades produces a pressurized hydraulic fluid output which varies in pressure in proportion to the rotational velocity of the blades with the second hydraulic control signal being generated in response to the pressurized hydraulic fluid output; and
   the first hydraulic control signal is generated in response to a high pressure hydraulic fluid output.

6. A ram air turbine in accordance with claim 2 wherein:
   a hydraulic fluid source driven by rotation of the blades produces a pressurized hydraulic fluid output which varies in pressure in proportion to the rotational velocity of the blades with the second hydraulic control signal being generated in response to the pressurized hydraulic fluid output; and
   the first hydraulic control signal is generated in response to a high pressure hydraulic fluid output.

7. A ram air turbine in accordance with claim 3 wherein:
   a hydraulic fluid source driven by rotation of the blades produces a pressurized hydraulic fluid output which varies in pressure in proportion to the rotational velocity of the blades with the second hydraulic control signal being generated in response to the pressurized hydraulic fluid output; and
   the first hydraulic control signal is generated in response to a high pressure hydraulic fluid output.

8. A ram air turbine in accordance with claim 4 wherein:
   a hydraulic fluid source driven by rotation of the blades produces a pressurized hydraulic fluid output which varies in pressure in proportion to the rotational velocity of the blades with the second hydraulic control signal being generated in response to the pressurized hydraulic fluid output; and
   the first hydraulic control signal is generated in response to a high pressure hydraulic fluid output.

9. A ram air turbine in accordance with claim 5 wherein:
   the anti-stall piston is movable between first and second positions in response to the second hydraulic control signal which causes the stroking piston to move between first and second positions with the first position of the stroking piston producing a maximum displacement of the variable displacement hydraulic pump and the second position of the stroking piston producing a minimum displacement: of the variable displacement hydraulic pump; and the stroking piston is movable between first and second positions independent of movement of the anti-stall piston in response to the first hydraulic control signal in the first rotational velocity range.

10. A ram air turbine in accordance with claim 9 further comprising:

a pressure regulator hydraulically coupled to a high pressure output of the variable displacement pump which shunts pressurized hydraulic fluid from the high pressure output to a lower pressure to regulate the output pressure of the variable displacement hydraulic pump with the lower pressure being the second hydraulic control signal.

11. A ram air turbine in accordance with claim 6 wherein:

the anti-stall piston is movable between first and second positions in response to the second hydraulic control signal which causes the stroking piston to move between first and second positions with the first position of the stroking piston producing a maximum displacement of the variable displacement hydraulic pump and the second position of the stroking piston producing a minimum displacement of the variable displacement hydraulic pump; and the stroking piston is movable between first and second positions independent of movement of the anti-stall piston in response to the first hydraulic control signal in the first rotational velocity range.

12. A ram air turbine in accordance with claim 11 further comprising:

a pressure regulator hydraulically coupled to a high pressure output of the variable displacement pump which shunts pressurized hydraulic fluid from the high pressure output to a lower pressure to regulate the output pressure of the variable displacement hydraulic pump with the lower pressure being the second hydraulic control signal.

13. A ram air turbine in accordance with claim 7 wherein:

the anti-stall piston is movable between first and second positions in response to the second hydraulic control signal which causes the stroking piston to move between first and second positions with the first position of the stroking piston producing a maximum displacement of the variable displacement hydraulic pump and the second position of the stroking piston producing a minimum displacement of the variable displacement hydraulic pump; and the stroking piston is movable between first and second positions independent of movement of the anti-stall piston in response to the first hydraulic control signal in the first rotational velocity range.

14. A ram air turbine in accordance with claim 13 further comprising:

a pressure regulator hydraulically coupled to a high pressure output of the variable displacement pump which shunts pressurized hydraulic fluid from the high pressure output to a lower pressure to regulate the output pressure of the variable displacement hydraulic pump with the lower pressure being the second hydraulic control signal.

15. A ram air turbine in accordance with claim 8 wherein:

the anti-stall piston is movable between first and second positions in response to the second hydraulic control signal which causes the stroking piston to move between first and second positions with the first position of the stroking piston producing a maximum displacement of the variable displacement hydraulic pump and the second position of the stroking piston producing a minimum displacement of the variable displacement hydraulic pump; and the stroking piston is movable between first and second positions independent of movement of the anti-stall piston in response to the first hydraulic control signal in the first rotational velocity range.

16. A ram air turbine in accordance with claim 15 further comprising:

a pressure regulator hydraulically coupled to a high pressure output of the variable displacement pump which couples pressurized hydraulic fluid from the high pressure output to a lower pressure to regulate the output pressure of the variable displacement hydraulic pump with the lower pressure being the second hydraulic control signal.

17. A ram air turbine in accordance with claim 10 wherein:

the first piston is positioned in the first position during rotation of the blades in the first rotational velocity range.

18. A ram air turbine in accordance with claim 12 further comprising:

a pressure regulator hydraulically coupled to a high pressure output of the variable displacement pump which couples pressurized hydraulic fluid from the high pressure output to a lower pressure to regulate the output pressure of the variable displacement hydraulic pump with the lower pressure being the second hydraulic control signal.

19. A ram air turbine in accordance with claim 14 further comprising:

a pressure regulator hydraulically coupled to a high pressure output of the variable displacement pump which couples pressurized hydraulic fluid from the high pressure output to a lower pressure to regulate the output pressure of the variable displacement hydraulic pump with the lower pressure being the second hydraulic control signal.

20. A ram air turbine in accordance with claim 16 further comprising:

a pressure regulator hydraulically coupled to a high pressure output of the variable displacement pump which couples pressurized hydraulic fluid from the high pressure output to a lower pressure to regulate the output pressure of the variable displacement hydraulic pump with the lower pressure being the second hydraulic control signal.

* * * * *